(12) United States Patent
Jooste (10) Patent No.: US 9,549,045 B2
(45) Date of Patent: Jan. 17, 2017

(54) SHARING REMOTE SESSIONS OF A USER INTERFACE AND/OR GRAPHICS OF A COMPUTER

(75) Inventor: Sarel Kobus Jooste, Novato, CA (US)

(73) Assignee: VMware, Inc., Palo Alto, CA (US)

( * ) Notice: Subject to any disclaimer, the term of this patent is extended or adjusted under 35 U.S.C. 154(b) by 351 days.

(21) Appl. No.: 13/449,129

(22) Filed: Apr. 17, 2012

(65) Prior Publication Data

US 2013/0054679 A1 Feb. 28, 2013

Related U.S. Application Data

(60) Provisional application No. 61/528,614, filed on Aug. 29, 2011, provisional application No. 61/528,627, filed on Aug. 29, 2011.

(51) Int. Cl.
  G06F 15/16 (2006.01)
  H04L 29/06 (2006.01)
  G06F 9/54 (2006.01)

(52) U.S. Cl.
  CPC ............... *H04L 67/38* (2013.01); *G06F 9/54* (2013.01); *H04L 65/40* (2013.01)

(58) Field of Classification Search
  CPC ............. H04L 67/38; H04L 65/40; G06F 9/54
  USPC ........................................ 709/203, 225, 227
  See application file for complete search history.

(56) References Cited

U.S. PATENT DOCUMENTS

| | | | |
|---|---|---|---|
| 5,214,519 A | 5/1993 | Faulhaber et al. | |
| 5,333,212 A | 7/1994 | Lightenberg | |
| 5,363,483 A | 11/1994 | Jones | |
| 6,571,245 B2 | 5/2003 | Huang et al. | |
| 6,591,266 B1 | 7/2003 | Li et al. | |
| 6,813,641 B2 | 11/2004 | Fomenko et al. | |
| 6,915,486 B2 | 7/2005 | Li et al. | |
| 6,950,101 B2 | 9/2005 | Hunt et al. | |
| 6,983,421 B1 | 1/2006 | Lahti et al. | |
| 7,000,008 B2 | 2/2006 | Bautista-Lloyd | |
| 7,308,490 B2 | 12/2007 | Peiffer et al. | |
| 7,349,905 B1 | 3/2008 | Jooste | |
| 7,418,472 B2 | 8/2008 | Shoemaker | |
| 7,426,578 B2 * | 9/2008 | Jones et al. | 709/248 |
| 7,502,838 B2 | 3/2009 | Franco et al. | |
| 7,522,536 B2 | 4/2009 | Roberts | |
| 7,703,024 B2 | 4/2010 | Kautzleben et al. | |
| 7,747,694 B2 | 6/2010 | McAllister | |
| 8,073,990 B1 | 12/2011 | Baron | |
| 8,209,372 B2 | 6/2012 | Abdo et al. | |
| 8,224,885 B1 | 7/2012 | Doucette | |
| 8,400,491 B1 * | 3/2013 | Panpaliya et al. | 348/14.12 |
| 8,572,162 B2 * | 10/2013 | Gokaraju et al. | 709/203 |
| 8,621,031 B2 * | 12/2013 | Desai | 709/217 |
| 8,769,400 B1 | 7/2014 | Thomas et al. | |
| 8,913,067 B1 | 12/2014 | Kokkevis | |

(Continued)

*Primary Examiner* — Brian J Gillis
*Assistant Examiner* — Steve Lin (57) ABSTRACT

Methods, systems, and techniques for sharing a remoted user interface are described. Example embodiments provide a Remote Session Sharing Protocol ("RSSP") for sharing a remoted user interface and/or graphics of a same computer system operating system or application. Use of the RSSP enables server computing systems to optimize the utilization of frame buffers and state information when multiple clients connect to the same remote session (e.g., connect to the same user interface of an application or operating system) at substantially the same time.

19 Claims, 6 Drawing Sheets

(56) References Cited

U.S. PATENT DOCUMENTS

| | | |
|---|---|---|
| 2002/0063715 A1* | 5/2002 | Foran .................. 345/501 |
| 2002/0111995 A1 | 8/2002 | Mansour et al. |
| 2003/0093585 A1 | 5/2003 | Allan |
| 2003/0163510 A1 | 8/2003 | Janssen |
| 2004/0054671 A1 | 3/2004 | Cohen et al. |
| 2004/0177147 A1 | 9/2004 | Joshi et al. |
| 2005/0138122 A1* | 6/2005 | Boehringer et al. ........ 709/205 |
| 2005/0149529 A1* | 7/2005 | Gutmans .................. 707/10 |
| 2005/0198364 A1 | 9/2005 | Val et al. |
| 2005/0256923 A1 | 11/2005 | Adachi |
| 2006/0039466 A1 | 2/2006 | Emerson et al. |
| 2006/0039468 A1 | 2/2006 | Emerson et al. |
| 2006/0082583 A1 | 4/2006 | Leichtling et al. |
| 2006/0156315 A1 | 7/2006 | Wood et al. |
| 2006/0174026 A1 | 8/2006 | Robinson et al. |
| 2006/0203007 A1 | 9/2006 | Bullard et al. |
| 2006/0212514 A1 | 9/2006 | Saillet |
| 2006/0248200 A1* | 11/2006 | Stanev .................. 709/227 |
| 2006/0265662 A1 | 11/2006 | Gertzen |
| 2007/0005990 A1* | 1/2007 | Sathish .................. 713/189 |
| 2007/0009182 A1 | 1/2007 | Yamauchi |
| 2007/0046980 A1 | 3/2007 | Coleman et al. |
| 2007/0073730 A1 | 3/2007 | Jun |
| 2007/0110303 A1 | 5/2007 | Bhattacharjya |
| 2007/0174429 A1 | 7/2007 | Mazzaferri et al. |
| 2007/0204003 A1 | 8/2007 | Abramson |
| 2007/0271332 A1 | 11/2007 | Joshi et al. |
| 2008/0005236 A1* | 1/2008 | Schmieder .................. 709/204 |
| 2008/0094411 A1 | 4/2008 | Parenteau |
| 2008/0098301 A1 | 4/2008 | Black et al. |
| 2008/0114889 A1 | 5/2008 | Deshpande |
| 2008/0201751 A1 | 8/2008 | Ahmed |
| 2008/0313545 A1* | 12/2008 | Patel et al. .................. 715/738 |
| 2008/0320531 A1 | 12/2008 | Kim et al. |
| 2009/0100125 A1 | 4/2009 | McDowell |
| 2009/0196406 A1* | 8/2009 | Brown et al. .............. 379/93.17 |
| 2009/0254664 A1* | 10/2009 | Wada .................. 709/227 |
| 2009/0313322 A1 | 12/2009 | Sheehan et al. |
| 2009/0319249 A1* | 12/2009 | White et al. .................. 703/13 |
| 2009/0327468 A1 | 12/2009 | Hirsch et al. |
| 2010/0023855 A1 | 1/2010 | Hedbor et al. |
| 2010/0077058 A1 | 3/2010 | Messer |
| 2010/0115023 A1 | 5/2010 | Peled |
| 2010/0138476 A1 | 6/2010 | Gokaraju |
| 2010/0138744 A1 | 6/2010 | Kamay et al. |
| 2010/0223348 A1* | 9/2010 | Przybysz et al. .............. 709/206 |
| 2010/0226441 A1 | 9/2010 | Tung |
| 2010/0250747 A1* | 9/2010 | Karaoguz et al. .............. 709/226 |
| 2010/0268694 A1 | 10/2010 | Denoue et al. |
| 2010/0325300 A1 | 12/2010 | Vasters et al. |
| 2011/0082946 A1 | 4/2011 | Gopalakrishnan |
| 2011/0134120 A1 | 6/2011 | Antonyuk |
| 2011/0141123 A1 | 6/2011 | Kumar et al. |
| 2011/0148892 A1 | 6/2011 | Shreiner |
| 2011/0258532 A1 | 10/2011 | Ceze |
| 2011/0276619 A1 | 11/2011 | Khan et al. |
| 2011/0276900 A1* | 11/2011 | Khan et al. .................. 715/753 |
| 2011/0316965 A1* | 12/2011 | Moore et al. .............. 348/14.09 |
| 2012/0060083 A1 | 3/2012 | Yuan et al. |
| 2012/0076197 A1 | 3/2012 | Byford et al. |
| 2012/0102392 A1 | 4/2012 | Reesman et al. |
| 2012/0117145 A1 | 5/2012 | Clift et al. |
| 2012/0120320 A1 | 5/2012 | Chowdhry et al. |
| 2012/0151373 A1 | 6/2012 | Kominac et al. |
| 2012/0159311 A1 | 6/2012 | Hanssen |
| 2012/0324037 A1 | 12/2012 | Ramadas |
| 2012/0324358 A1 | 12/2012 | Jooste |
| 2013/0054672 A1 | 2/2013 | Stilling et al. |
| 2013/0054679 A1 | 2/2013 | Jooste |
| 2013/0055113 A1* | 2/2013 | Chazin et al. .................. 715/758 |
| 2013/0335320 A1 | 12/2013 | Mori et al. |
| 2014/0028690 A1 | 1/2014 | Rivera |

* cited by examiner

SHARING REMOTE SESSIONS OF A USER INTERFACE AND/OR GRAPHICS OF A COMPUTER

CROSS-NOTING TO RELATED APPLICATIONS

This application is related by subject matter to U.S. patent application Ser. No. 13/162,365 filed on filed Jun. 16, 2011 and entitled "DELIVERY OF A USER INTERFACE USING HYPERTEXT TRANSFER PROTOCOL," which is incorporated herein by reference in its entirety.

This application also claims the benefit of U.S. Provisional Application No. 61/528,614, entitled "PRESENTING DYNAMICALLY CHANGING IMAGES IN A LIMITED RENDERING ENVIRONMENT," filed on Aug. 29, 2011; and claims the benefit of U.S. Provisional Application No. 61/528,627, entitled "SHARING REMOTE SESSIONS OF A USER INTERFACE AND/OR GRAPHICS OF A COMPUTER," filed on Aug. 29, 2011; both of which are also incorporated herein by reference in their entireties.

TECHNICAL FIELD

The present disclosure relates to methods, techniques, and systems for sharing a user interface and/or graphics and, in particular, to methods, techniques, and systems for sharing, among several clients, a user interface and/or graphics of a same computer system operating system or application.

BACKGROUND

Application publishing and server-based computing allow a client computing device to access and utilize an application program or operating system that runs on a remote server computing system (a server). The server sends a user interface, such as a graphical user interface for the application or a desktop user interface for the operating system, over a network to the client device. As a user provides input to an input device associated with the client device, the client device sends the received input over the network to the server so that the application or operating system can process the input and, potentially, update the client user interface, which is eventually rendered on the client device.

When such an interface is rendered on the client device, it may be referred to as a "remoted" interface, because the interface rendered on the client device corresponds to code running remotely on either a physical or virtual server computing system (a server). In some cases, the client device (the client) may be resident on the same physical computing system as the server, and hence "remoted" refers to the server executing outside the client process. In other cases the client device and server computing system are executing on different physical or virtual machines and may communicate over standard networking mechanisms such as using TCP/IP or other protocols and "remoted" refers to running over a network, such as a local or wide-area network.

Different mechanisms exist for providing a remoted user interface. Remote Desktop Services (RDS) is a component of the Microsoft Windows operating system that allows a user (via a client device) to access the operating system, applications, and data on a remote computer over a network. RDS employs a protocol known as the Remote Desktop Protocol (RDP) for remoting a desktop over a network. The server component of RDS is called Terminal Server, which listens on a configured TCP port. When an RDP client connects to this port, it is associated with a unique TCP session. Microsoft Windows authenticates the user and the Microsoft Windows RDS virtual display driver presents the user interface (UI) to the client device. Once a client initiates a connection and is informed of a successful connection to the server, it loads keyboard/mouse drivers delivered to it over the network by the server. The graphical user interface (GUI) data received over RDP is decoded and rendered as a GUI on the client machine using the downloaded keyboard/mouse drivers. Keyboard and mouse inputs by the user to the client device ordinarily are transmitted to the server to allow a user control and access applications and data on the remote server.

Virtual Network Computing (VNC) is a graphical desktop sharing system that typically uses the Remote Frame Buffer (RFB) protocol to allow a client to remotely control a server computing system over a persistent TCP connection. The RFB protocol allows the server to update the frame buffer displayed on a VNC viewer running on the client device. In general terms, a frame buffer typically occupies a portion of a RAM used for temporary storage of image data that is available for display. A VNC viewer running on an operating system on a client device may connect to a VNC server running on the same or a different operating system to receive data. According to the RFB protocol, the server sends small rectangles of the server machine frame buffer to the client, which the client then assembles to form and render the graphical user interface on the client. VNC allows for various encoding methods to determine the most efficient way to transfer the rectangles from the server frame buffer to the client VNC viewer. The VNC protocol ordinarily allows the client and server to negotiate which encoding will be used. One encoding method supported by most VNC clients and servers, is "raw encoding," in which pixel data is sent in left-to-right scan-line order, and in which after the first or original full screen has been transmitted, only frame buffer rectangles that have changed are transferred.

Some VNC implementations, e.g., "RealVNC," available from RealVNC Ltd. of Cambridge, UK, use a Hypertext Transfer Protocol (HTTP) server to provide a VNC viewer to the client as a Java applet. The Java applet then connects to the VNC server for remote UI access over a separate persistent TCP connection. Yet another VNC implementation, referred to as "ThinVNC," available from Cybele Software, Inc. of Wilmington, Del., uses the Web Socket protocol of HTML5 for remote access to a user interface. Web Socket involves use of a persistent TCP connection between a client and a server that runs a remote application. WebSocket uses HTTP as a conduit to set up persistent connection between client and server. In particular, Web-Socket features an HTTP-compatible handshake that allows a server to interpret part of the handshake request as HTTP and then switch to WebSocket.

Existing technologies therefore require persistent connections for remoting a user interface or use advanced, and potentially insecure, web technologies such as WebSockets, which are not always available. In addition, for each client access to the data, a separate connection to the server is maintained, and the server typically keeps a separate frame buffer and state information for each such client device connected—even if they are sharing and/or viewing the same data or user interface. Such duplication results in many inefficiencies including drag on the network and may increase latency for each user.

In particular, a server typically maintains state information for each client device (user) that is viewing the remoted user interface. This state information may encompass maintaining a connection, keeping one or more copies of the physical screen buffer (or virtual screen buffer, depending upon the remoting mechanism) of the server that corresponds to the client. In addition, a series of state machines and/or change rectangles may be stored by the server to remember the state of the client for use calculating screen updates (image updates). Such state information is often used to save bandwidth to allow the server to just send frame buffer updates instead of the entire frame buffer at each user interface update cycle. Some remoting protocols even keep multiple copies of the frame buffer and/or state machine (also referred to as a "stack") for each user. Thus, if multiple users/client devices are sharing the same application or user interface, the overhead of maintaining state for the remote display protocols for each user/client can be significant, especially when interfaces are shared with thousands or even tens of thousands of user.

DETAILED DESCRIPTION

Embodiments described herein provide enhanced computer- and network-based methods, systems, and techniques for sharing a remoted user interface and/or graphics of a same computer system operating system or application. Example embodiments provide a Remote Session Sharing Protocol ("RSSP"), which enables server computing systems (servers) to optimize the utilization of frame buffers and state information when multiple clients connect to the same remote session (e.g., connect to the same user interface of an application or operating system) at substantially the same time. As used herein, substantially the same time, means that more than one client device is trying to view the same user interface with overlap in time. It does not mean that the viewing needs to happen at exactly the same time; just that more than one client is trying to view the same user interface to effectively share it. The RSSP technique allows a server to share any type of screen—GUI, text, audio, etc—with many users in a more efficient manner by grouping client requests with similar connection profiles and sending them the same (graphical/user interface) data at the same time. That way, a single server-side frame buffer and client state information may be shared among multiple clients reducing the amount of server-side overhead. Use of RSSP is intended to reduce the amount of volatile memory, processing power, and network bandwidth used to support the sharing of applications and/or a desktop.

RSSP can be used for sharing a user interface executing on either a physical or a virtual machine. In addition, RSSP is usable for any type of connection from the client devices to the server: the client devices may be connected to the server by means of a direct connection, a proxied connection, or any number of intermediate connections. Also, no change to RSSP is required to support caching or protocol accelerators.

RSSP provides connection management logic to determine whether different client connections share a similar profile and thus should be grouped together to receive image updates that constitute the shared user interface. When a client requests an update, the RSSP connection management logic reviews the request to determine in which group the request should be placed. Based upon the assigned grouping, the clients that are grouped together receive images using the same shared server-side frame buffer and state information. Since client requests are tested and grouping changed dynamically, the RSSP supports a system that adjusts to changing network conditions and other variables that can affect the throughput of the data to the clients. In addition, the groups themselves may be formed dynamically to adjust to the profiles of the clients sharing the data.

Figure 1:
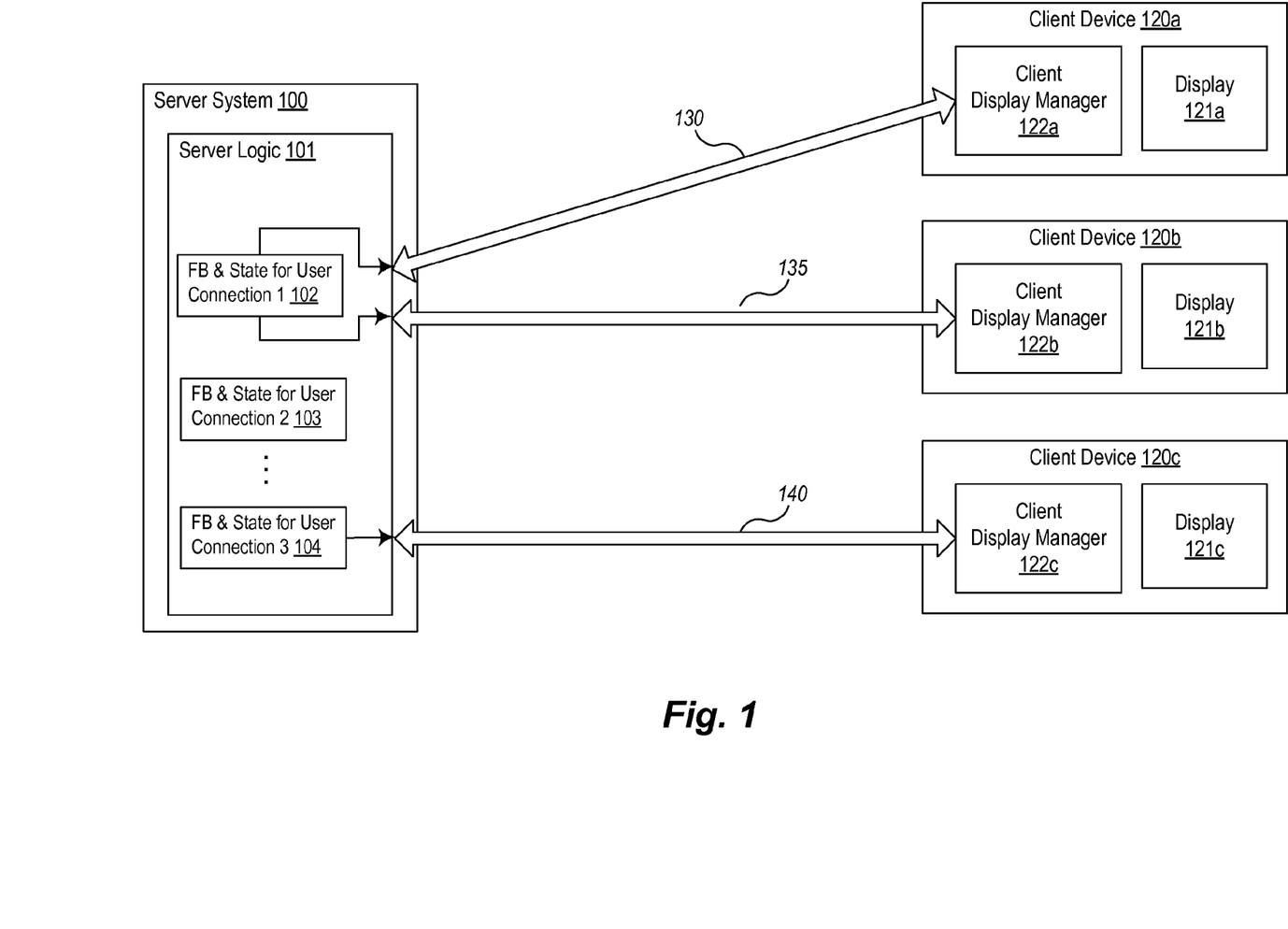
FIG. 1 is a block diagram of an example environment for practicing the example embodiments for remote session sharing and illustrates data flows between a server system and one or more client devices according to an example embodiment.

FIG. 1 is a block diagram of an example environment for practicing the example embodiments for remote session sharing and illustrates data flows between a server system and one or more client devices according to an example embodiment. In FIG. 1, server system 100 (server) communicates with multiple client devices, for example, client devices 120a-120c, to share a user interface (not shown) that is executing on server 100. Such sharing might take place, for example, to use an enterprise software application, run a conferencing application, share a file, or the like. Server logic 101 executes on server 100 to control the communication of the shared user interface using RSSP. The image data of the shared user interface is transferred over one of connections 130, 135, and 140 based upon frame buffer data and state information to the one or more corresponding clients. Each client device, such as client devices 120a-120c, includes client display manager logic 122a-122c, which receives the transferred images and displays (e.g., presents, renders, etc.) them on a corresponding display 121a-121c.

The server logic 101 typically maintains a frame buffer and state information for each communications connection 130, 135, and 140. As illustrated, the three different connections 130, 135 and 140 (e.g., TCP/IP based connections) use at least one of the state information data 102 103, and 104, which each include a server-side frame buffer and state information stack to send image data to each of the one or more of the client devices 120a-120c. In particular, after server 100 determines that the two client devices 120a and 120b have similar delivery or connection profiles, the server 100 services them by means of sharing frame buffer and state information 102 between them by using the same frame buffer and state information 102 to service their communications connections. In effect, the same image data that is stored in frame buffer and state information 102 is transmitted (e.g., forwarded, pushed, communicated, sent, etc.) to both clients 120a and 102b over their respective communications connections 130 and 135. As illustrated in FIG. 1, the server 100 has determined that the third client device 120c has a different connection profile and thus has created (e.g., instantiated, made available, etc.) a unique frame buffer and state information 104 to service this user/client. The frame buffer and state information 103 is being used for other clients (not shown) that do not share a similar connection profile to those connected to frame buffer and state information 102 or frame buffer and information state 103. The frame buffer and state information that is shared is referred to as a "user connection," a "data connection," or a "session" to distinguish it from the underlying communications connection.

As described herein, a user is generally indistinct from a client. However, in other embodiments where potentially more than one user shares the same client device, adjustments are made such that the server-side connections are shared on a per user basis (instead of equating it with a per client basis). Also, since the communications connections 130, 135 and 140 are dependent upon the underlying architecture, there may be other embodiments that support more communications connections per device and/or shared communications connection between devices.

Each frame buffer and state information, for example, user connections 102-104 is shared between users/clients having a similar delivery or connection profile. In some embodiments, connection profiles are considered similar based upon how long it takes for a client to process and render received data, the speed of the network connection, or the like. One measure of similarity is the time it takes to consume some number of frames of image data. For example, some clients may consume data at a rate of 40 frames per second (fps), others at 10 fps, etc. Since the server 100 can measure how frequency an update is requested, this measure can be used as a proxy for the rate of consumption. Other measures of similarity may be similarly incorporated.

Figure 2:
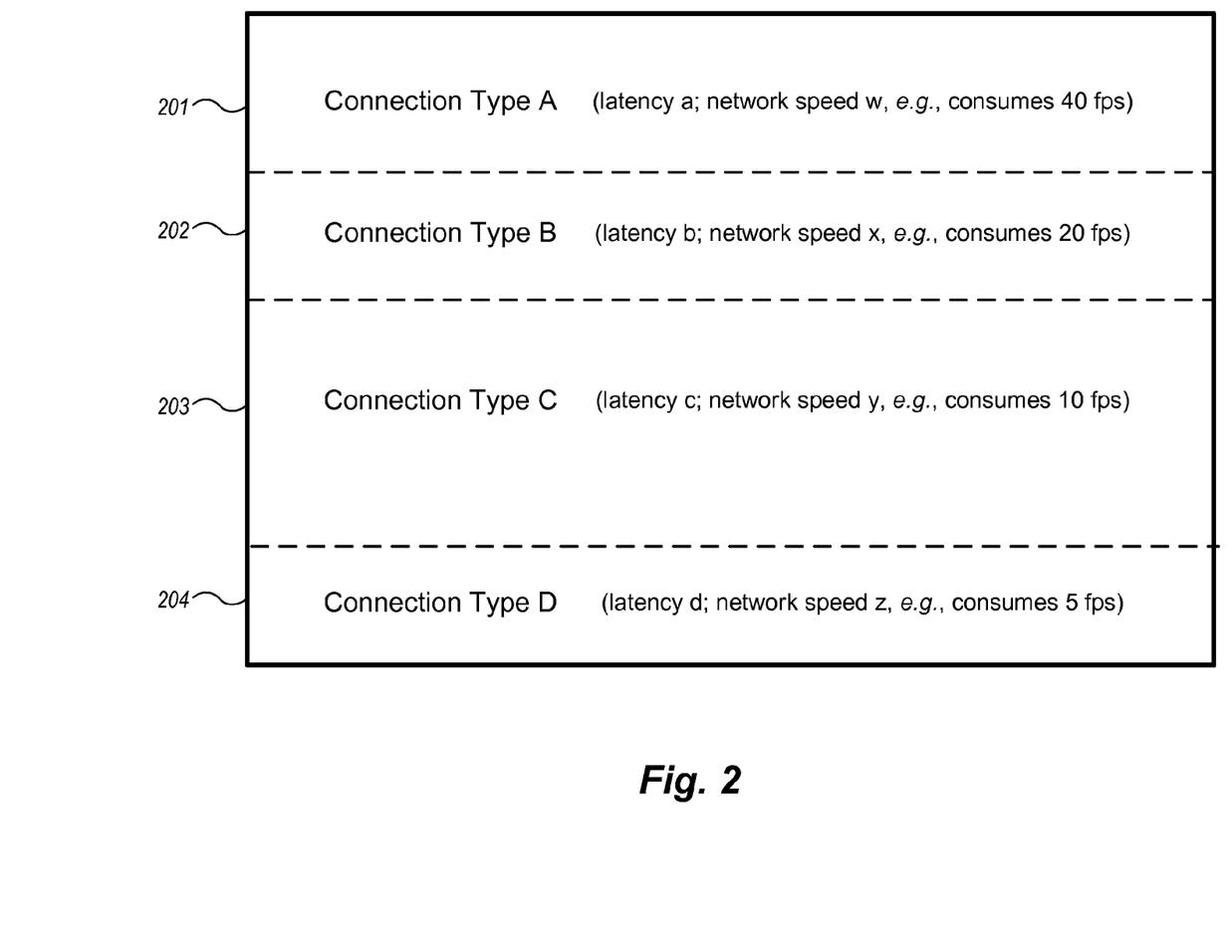
FIG. 2 is an example block diagram of user connections for managing shared user interface and/or graphic data flow according to example embodiments.

The data sharing user connections supported by a server, such as server 100, can be thought of as "lanes" (or paths) that are occupied by clients that share similar connection profiles. FIG. 2 is an example block diagram of user connections for managing shared user interface and/or graphic data flow according to example embodiments. In FIG. 2, four user connections 201-204 comprise different types, characterized by their connection profiles. For example, connection type A 201 is allocated to clients with connection profiles that exhibit behavior close to latency "a" and network speed "w" measured, for example as consuming data at a rate of 40 fps. Connection type B 202 is allocated to clients with connection profiles that exhibit behavior close to latency "b" and network speed "x" measured, for example as consuming data at a rate of 20 fps up to 39 fps. Connection type C 203 is allocated to clients with connection profiles that exhibit behavior close to latency "c" and network speed "y" measured, for example as consuming data at a rate of 10 fps up to 19 fps. Connection type D 204 is allocated to clients with connection profiles that exhibit behavior close to latency "d" and network speed "z" measured, for example as consuming data at a rate of 5 fps up to 9 fps.

FIG. 2 illustrates different "widths" of user connections (lanes) 201-204 to represent the number of clients utilizing each band. In reality, the more clients using a particular shared connection, the potentially slower the throughput for each one. This behavior is due to the fact that the server serves the shared image data at a speed commensurate with the slowest connection profile. So if there are three different clients sharing connection type C 203 with consumption rates of 10 fps, 12 fps, and 18 fps, then all three clients will be receiving data closer to the rate of the slowest client, at 10 fps. Also, the more user connections, potentially the better granularity of the output to each client; however, the total load on the server becomes higher putting other throughput pressures on the system. At any point in time, the user connection types can be increased or combined, depending on server resources, and clients can be switched to different connection types. Any algorithm for doing this can be incorporated. In general, when a client is added to a user connection, if it exceeds a threshold for that user connection (based, for example, upon the throughput for that user connection), then other user connections will be reviewed for a likely one to best absorb the new client. In one embodiment, the algorithm adds the new client to the user connection that results in optimized throughput for each client.

Figure 3:
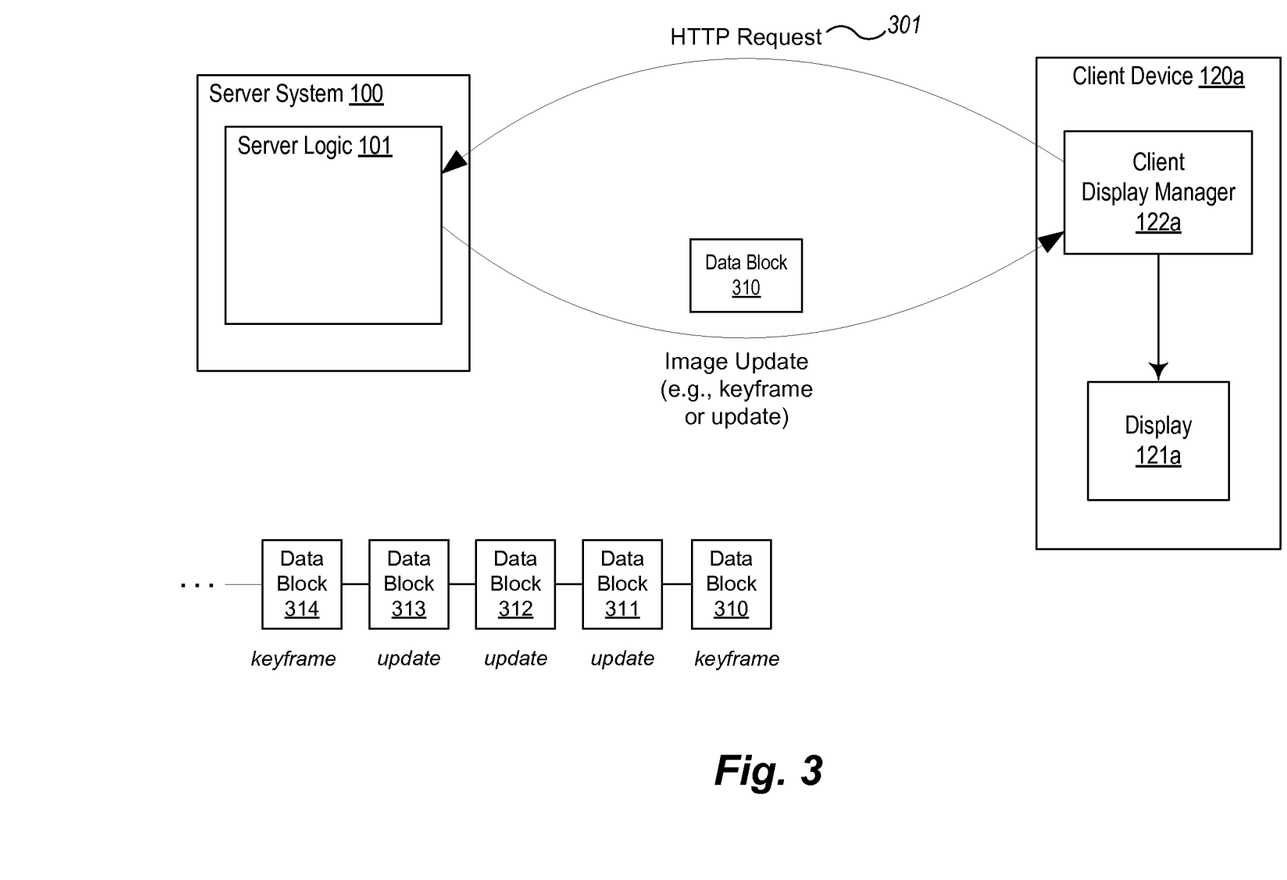
FIG. 3 is an example block diagram of a data flow for providing a shared user interface and/or graphic data during a remote session from a server system to a client device using an HTTP request-response protocol.

FIG. 3 is an example block diagram of a data flow for providing a shared user interface and/or graphic data during a remote session from a server system to a client device using an HTTP request-response protocol. FIG. 3 illustrates a use case where RSSP is used in a typical web-based environment, where a web browser (client display manager 122*a*) executes on client device 120*a* to render image data from a user interface executing on server system 100. As shown, the use of RSSP by server logic 101 is transparent to the standard request-response protocol of HTTP. The client 120*a* still makes an HTTP request 301 to server logic 101 executing on the server 100. The server logic 101 then determines whether to send an entire frame buffer image (a key frame) or an update of a portion of the server-side maintained frame buffer, as data block 310 to the client display manager 122*a*. Once data block 310 is received at the client 120*a*, the client display manager 122*a* renders the image on display 121*a*. A detailed description of this client server communication can be found in co-pending U.S. patent application Ser. No. 13/162,365 filed on Jun. 16, 2011 and entitled "DELIVERY OF A USER INTERFACE USING HYPERTEXT TRANSFER PROTOCOL."

In one such embodiment, images that correspond to the shared user interface are transmitted via HTTP using an update mechanism that provides key frames when needed and layer updates to composite them in a single rendered image as described in U.S. Provisional Application No. 61/528,627, filed on Aug. 29, 2011 and entitled "PRESENTING DYNAMICALLY CHANGING IMAGES IN A LIMITED RENDERING ENVIRONMENT." The RSSP technique may be used with the techniques described in both of these patent applications. FIG. 3 illustrates that sequential data blocks may be transferred from the server 100 to the client 120*a* as a key frame data block 310, followed by three image data block updates 311-313, followed by another key frame data block 314. As explained in the latter provisional patent application, key frames may be transferred, for example, when it is necessary to refresh a client's view of the frame buffer or, for example, when the rendering mechanism can no longer support updates (such as when a threshold number of compositing layers are exceeded).

Using RSSP, when a client requests a new communications connection, the server 100 may need to supply a new key frame to the client device newly joining the user connection. This can be done by, for example, (tracking and) supplying an initial key frame and a sequence of updates or by pausing the other clients that are participating in the connection and sending all of them a new key frame. This aligns all clients that share that user connection.

Although described with respect to HTTP in FIG. 3, the RSSP techniques are generally applicable to any type of communication protocol that provides shared image data from a server to a multiplicity of clients. Also, although certain terms are used primarily herein, other terms could be used interchangeably to yield equivalent embodiments and examples. In addition, terms may have alternate spellings which may or may not be explicitly mentioned, and all such variations of terms are intended to be included.

Example embodiments described herein provide applications, tools, data structures and other support to implement RSSP in any server user interface sharing system. Other embodiments of the described techniques may be used for other purposes. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps described with reference to any particular routine.

Figure 4:
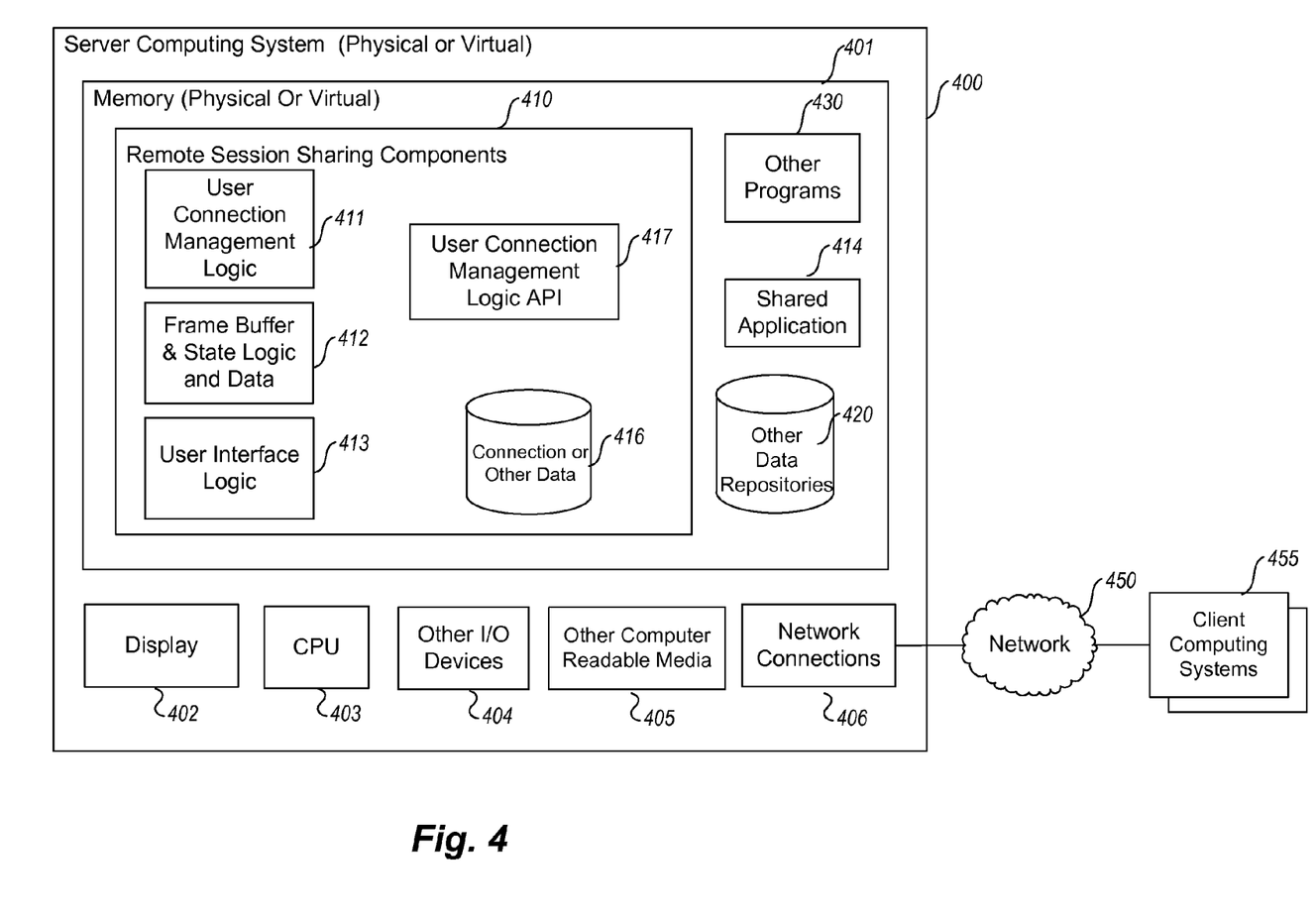
FIG. 4 is an example block diagram of an example server computing device that may be used to practice example embodiments of the remote session sharing logic.

FIG. 4 is an example block diagram of an example server computing device that may be used to practice example embodiments of the remote session sharing logic of a server as described herein. Note that a general purpose or a special purpose computing system suitably instructed as described herein may be used to implement remote session sharing using RSSP. Further, the remote session sharing using RSSP may be implemented in software, hardware, firmware, or in some combination to achieve the capabilities described herein.

The computing system 400 may comprise one or more server and/or client computing systems and may span distributed locations. In addition, each block shown may represent one or more such blocks as appropriate to a specific embodiment or may be combined with other blocks. Moreover, the various blocks of the remote session sharing components 410 may physically reside on one or more machines, which use standard (e.g., TCP/IP) or proprietary interprocess communication mechanisms to communicate with each other.

In the embodiment shown, computer system 400 comprises a computer memory ("memory") 401, a display 402, one or more Central Processing Units ("CPU") 403, Input/Output devices 404 (e.g., keyboard, mouse, CRT or LCD display, etc.), other computer-readable media 405, and one or more network connections 406. The remote sharing session components 410 are shown residing in memory 401. In one embodiment the components for implementing the remote session sharing using RSSP are deployed as part of or execute on top of the operating system (not shown) of server 400, also residing in memory 401. In other embodiments, some portion of the contents, some of, or all of the remote session sharing components may be stored on and/or transmitted over the other computer-readable media 405.

The remote session sharing components 410 preferably execute on one or more CPUs 403 and manage the shared use of image data connections, including server-side frame buffers and user state information, as described herein. If an application is begin shared between clients using the remote session sharing components 410, then the shared application 414 may reside also in the memory 401 of the server 400, or may be available from some other physical or virtual system of component. Other code or programs 430 and potentially other data repositories, such as data repository 420, also reside in the memory 401, and preferably execute on one or more CPUs 403. Of note, one or more of the components in FIG. 4 may not be present in any specific implementation. For example, some embodiments embedded in other software may not provide means for user input or display.

In a typical embodiment, the remote session sharing components 410 include connection management logic 411, one or more frame buffers and state logic and data 412, user interface logic 413, and user connection data repository 416.

The connection management logic 411 is used to set up shared user connection paths for one or more client devices as described with respect to FIGS. 1-3 and 5A-5B. Connection management logic 411 determines whether a client device, such as client device 120a, should be joined to an existing user connection path and receive data images from frame buffers and according to the state information maintained for that path or should result in the establishment (e.g., creation, instantiation, etc.) of a new user connection path. In addition, connection management logic 411 determines whether to join or to split existing user connection paths.

The frame buffer and state logic and data component 412 is used to implement and to store server-side frame buffer and state information for implementing what is sometimes termed a user "stack." Component 412 determines whether an entire frame buffer is to be transmitted (for example, as a key frame) or whether to send a sequence, and which sequence, of update data blocks. This component is invoked by the connection management logic 411 to transmit the appropriate data to a client device over a corresponding user connection path.

User interface logic 413 controls other aspects of sharing a remoted interface such as making sure various aspects of the interface are kept synchronized or other behaviors. For example, in the case of remoting the desktop of the operating system that executes on the server 400, the user interface logic 413 implements the desktop from the server side.

In at least some embodiments, some of the components of the remote session sharing component 410 are provided external to the server 400 and are available, potentially, over one or more networks 450. Other and/or different modules may be implemented. In addition, the remote session sharing components interact via a network 450 with the application or client code 455, such as web browsers executing on client systems, that receive data images comprising the shared user interfaces. The connection data repository 416 may be provided external to the remote session sharing components, for example in a knowledge base or other service accessible over one or more networks 450.

In an example embodiment, components/modules of the remote session sharing components 410 are implemented using standard programming techniques. However, a range of programming languages known in the art may be employed for implementing such example embodiments, including representative implementations of various programming language paradigms, including but not limited to, object-oriented (e.g., Java, C++, C#, Smalltalk, etc.), functional (e.g., ML, Lisp, Scheme, etc.), procedural (e.g., C, Pascal, Ada, Modula, etc.), scripting (e.g., Perl, Ruby, Python, JavaScript, VB Script, etc.), declarative (e.g., SQL, Prolog, etc.), etc.

The embodiments described above may also use well-known or proprietary synchronous or asynchronous client-server computing techniques. However, the various components may be implemented using more monolithic programming techniques as well, for example, as an executable running on a single CPU computer system, or alternately decomposed using a variety of structuring techniques known in the art, including but not limited to, multiprogramming, multithreading, client-server, or peer-to-peer, running on one or more computer systems each having one or more CPUs. Some embodiments are illustrated as executing concurrently and asynchronously and communicating using message passing techniques. Equivalent synchronous embodiments are also supported.

In addition, programming interfaces to the data stored as part of the remote session sharing components 410 (e.g., in the frame buffer and state logic data 412) can be available by standard means such as through C, C++, C#, and Java APIs; libraries for accessing files, databases, or other data repositories; through scripting languages such as XML; or through Web servers, FTP servers, or other types of servers or services providing access to stored data. The connection data repository may be implemented as one or more database systems, file systems, or any other method known in the art for storing such information, or any combination of the above, including implementation using distributed computing techniques.

Also the example remote session sharing components 410 may be implemented in a distributed environment comprising multiple, even heterogeneous, computer systems and networks, whether physical or virtual. For example, the components may be located in physically different computer systems. In another embodiment, the various modules of the remote session sharing components 410 are hosted each on a separate server machine. Also, one or more of the modules may themselves be distributed, virtualized, pooled or otherwise grouped, such as for load balancing, reliability or security reasons. Different configurations and locations of programs and data are contemplated for use with techniques of described herein. A variety of distributed computing techniques are appropriate for implementing the components of the illustrated embodiments in a distributed manner including but not limited to TCP/IP sockets, Web sockets, RPC, RMI, HTTP, Web Services (XML-RPC, JAX-RPC, SOAP, etc.) etc. Other variations are possible. Also, other functionality could be provided by each component/module, or existing functionality could be distributed amongst the components/modules in different ways, yet still achieve remote session sharing using RSSP.

Furthermore, in some embodiments, some or all of the components may be implemented or provided in other manners, such as at least partially in firmware and/or hardware, including, but not limited to one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as executable or other machine readable software instructions or structured data) on a computer-readable medium (e.g., a hard disk; a memory; a network; or a portable media article to be read by an appropriate drive or via an appropriate connection). Some or all of the components and/or data structures may be stored on tangible storage mediums. Some or all of the system components and data structures may also be transmitted in a non-transitory manner via generated data signals (e.g., as part of a carrier wave or other analog or digital propagated signal) on a variety of computer-readable transmission mediums, such as media 405, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 5A:
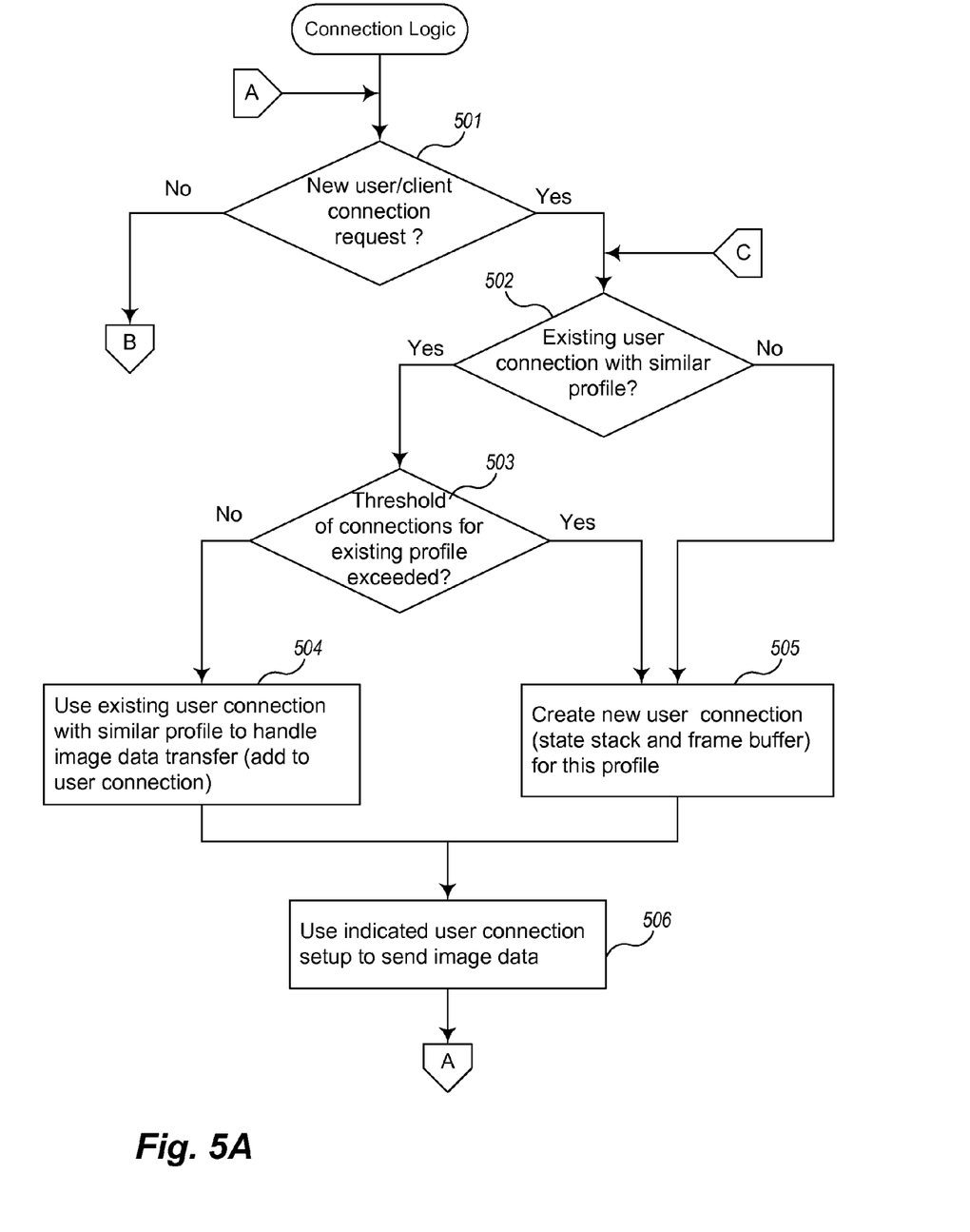
FIGS. 5A and 5B are an example flow diagram of an example server logic for remote session sharing performed according to an example embodiment.
Figure 5B:
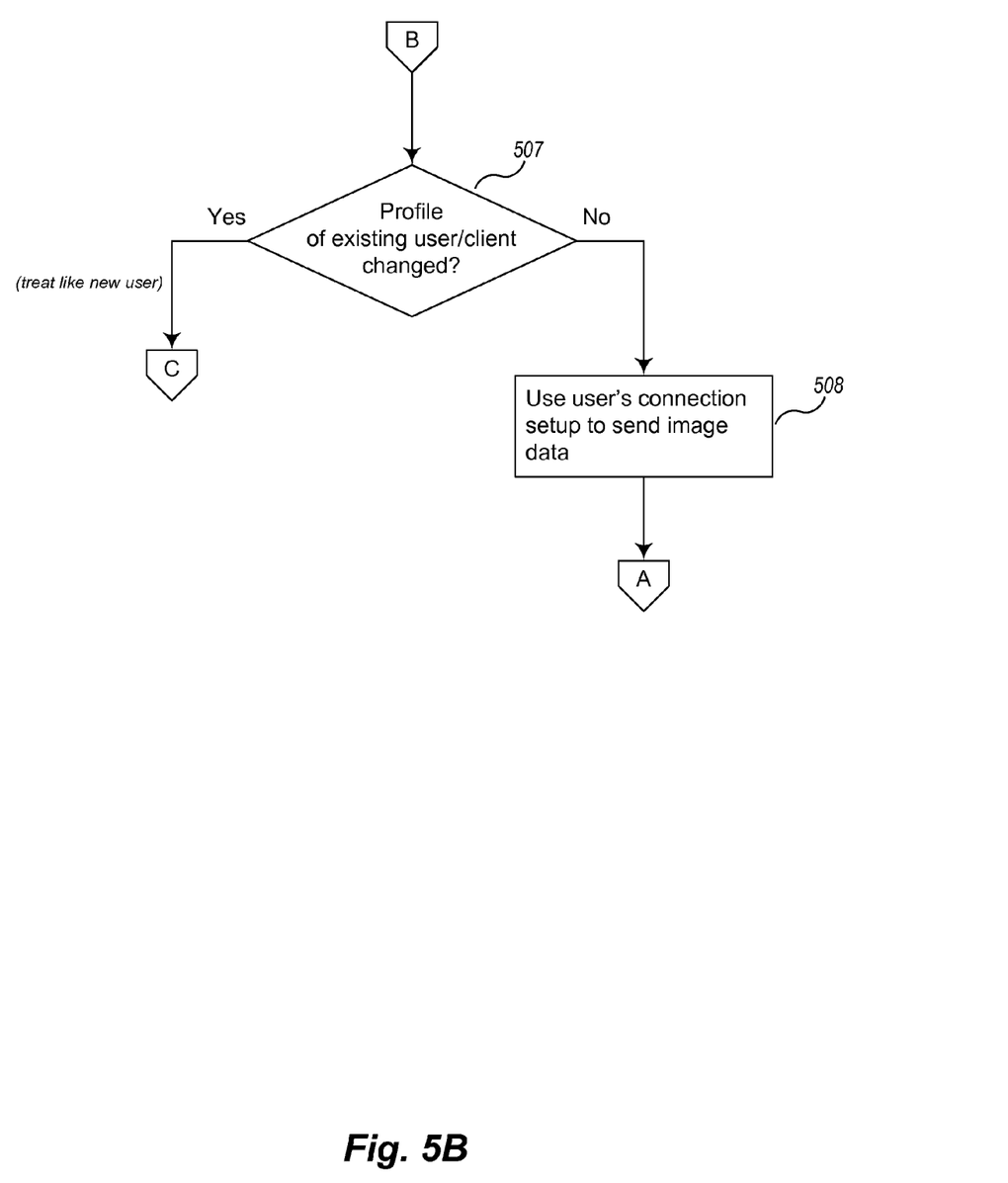

As described in FIG. 4, a server computing system that implements RSSP includes server logic to manage the user connections to client devices for receiving images of a user interface of a shared session. FIGS. 5A and 5B are an example flow diagram of an example server logic for remote session sharing performed according to an example embodiment. This logic may be performed, for example, by the connection management logic component 411 in FIG. 4. The flows described are examples, other logic flows and other features may be implemented for the shared connections managed by this logic.

In block 501, the logic determines whether a new user/client connection request has been received. This event may occur, for example, when a client device indicates that it wishes access to a shared application or an interface such as a web-based conferencing tool. (In some embodiments, this request may be implemented as part of the communications connection setup.) If so, the logic continues in block 502 to process the new client connection request, otherwise continues in block 507 to process the request from a client already connected via the remote session sharing mechanism.

If a new user/client connection request is detected, then in block 502, the logic determines whether the new client device has a connection profile that is similar to a connection profile associated with an existing user connection path. If so, then the logic continues at block 503, otherwise continues at block 505.

As described with reference to FIGS. 1 and 2, similar connection profiles may be based upon different factors, including, for example, latency of the network connection, network speed, or other measures of throughput to the client device. In one embodiment, the logic measures similarity of connection profiles by measuring the consumption rate of the device—e.g., how often the device requests updated user interface data. As one example, the logic may determine that the new client device consumes data at 20 frames per second (fps), while the available connection paths produce data at 30 fps or 10 fps. If the logic determines that the new client device should share the user connection path represented by the 10 fps type of connection, then the new client device will receive the shared data at a slower rate (by 10 fps). If, instead, the logic determines that the new client device should share the user connection path represented by the 30 fps type of connection, then the logic will need to change the profile of the user connection path down to 20 fps and the existing connections to other client devices may be affected. Alternatively, if there are sufficient server-side resources, the logic may decide to split the existing user connection paths and make room for a new user connection path. As described with reference to FIG. 2, different joining and splitting algorithms may be accommodated by the logic.

In block 503, when an existing user connection is found to have a profile sufficiently similar to the requested user connection, then the logic determines whether there is room to add the new client to the existing user connection. For example, due to network throughput concerns, there may be a limit on the number of devices that are supportable from a single frame buffer and state stack. If the relevant thresholds are not exceeded, then the logic continues at block 504. Otherwise, the logic continues at block 505, as if no user connection had been found with a similar profile.

In block 504, the logic sets up the new client device to be connected to the determined existing connection resources such that the frame buffer and state information of the existing user connection is used to update the client device display. The logic then continues in block 506.

In block 505, when no existing user connection path is found to be sufficiently similar to the requested user connection, then the logic creates a new user connection (with a new state information stack and frame buffer) for this profile. As described in the previous examples, there are many ways to accomplish creating a new user connection, including splitting an existing user connection to create two user connections from a single one, and creating a new user connection altogether. The new user connection is associated with a frame buffer and state information, which will then be shared by all of the client devices associated with this connection. The logic then continues with block 506.

In block 506, the logic uses the indicated client connection setup, including the frame buffer and state information of the existing user connection, to update the client device displays associated with the user connection, and then returns to block 501 to wait for the next client request.

In block 507, the logic continues to process the request from a client already connected via the remote session sharing mechanism. In particular, the logic checks to make sure that the connection profile of the client request has not changed in a manner that indicates that it would be beneficial to treat the request as a new client request. If the connection profile has so changed, then the logic continues at block 502, otherwise continues in block 508.

In block 508, the logic uses the indicated client connection setup, including the frame buffer and state information of the existing user connection, to update the client device displays associated with the user connection, and then returns to block 501 to wait for the next client request.

All of the above U.S. patents, U.S. patent application publications, U.S. patent applications, foreign patents, foreign patent applications and non-patent publications referred to in this specification and/or listed in the Application Data Sheet, including but not limited to U.S. patent application Ser. No. 13/162,365, entitled "DELIVERY OF A USER INTERFACE USING HYPERTEXT TRANSFER PROTOCOL," filed Jun. 16, 2011; U.S. Provisional Application No. 61/528,614, entitled "PRESENTING DYNAMICALLY CHANGING IMAGES IN A LIMITED RENDERING ENVIRONMENT," filed on Aug. 29, 2011; and U.S. Provisional Application No. 61/528,627, entitled "SHARING REMOTE SESSIONS OF A USER INTERFACE AND/OR GRAPHICS OF A COMPUTER," filed on Aug. 29, 2011; are incorporated herein by reference in their entireties.

From the foregoing it will be appreciated that, although specific embodiments have been described herein for purposes of illustration, various modifications may be made without deviating from the spirit and scope of the invention. For example, the methods, systems, and techniques for presenting dynamically changing images discussed herein are applicable to architectures or environments other than a Web-based environment. Also, the methods, systems, and techniques discussed herein are applicable to differing protocols, communication media (optical, wireless, cable, etc.) and devices (such as wireless handsets, electronic organizers, personal digital assistants, tablet computers, smart phones, portable email machines, game machines, pagers, navigation devices such as GPS receivers, etc.)

The invention claimed is:

1. A method in a computing system for sharing a currently allocated session that is allocated to a first client device, comprising:

receiving, from a browser operating on a second client device, a hypertext transfer protocol (HTTP) request to remote a graphical user interface (GUI) of an application or a desktop running on a server to the second client device using HTTP requests and responses;

determining connection characteristics for the second client device;

determining whether to share the currently allocated session with the second client device based on the connection characteristics, the currently allocated session being used to remote the GUI of the application or the desktop running on the server to the first client device, wherein the second client device is distinct from the first client device, wherein the GUI is defined in a first frame buffer on the server and is associated with first state information;

associating the second client device with the currently allocated session when a determination is made to share the currently allocated session;

in response to the determination to share the currently allocated session, pausing all clients that share the currently allocated session and transmitting to said all clients a new key frame to align said all clients that share the currently allocated session, wherein transmitting the new key frame includes sending to the second client device over HTTP, the new key frame that contains an entire image of the first frame buffer on the server; and sending to the second client device over HTTP, a sequence of updates to the GUI of the application or the desktop running on the server contained in the first frame buffer and using the first state information associated with the currently allocated session.

2. The method of claim 1, further comprising:

allocating a new session having a new session connection profile when a determination is made to not share the currently allocated session;

associating the second client device with the new session when the determination is made to not share the currently allocated session; and sending image data to the second client device in accordance with a second frame buffer and second state information associated with the new session the determination is made to not share the currently allocated session.

3. The method of claim 2 wherein allocating the new session comprises:

splitting the currently allocated session into a first new session and a second new session;

associating the first client device with the first session; and associating the second client device with the second session.

4. The method of claim 1 wherein the determining whether to share the currently allocated session with the second client device based on the connection characteristics comprises:

determining a second consumption rate for the second client device; and determining whether the second consumption rate for the second client device is within a determined range of a first consumption rate associated with a session connection profile of the currently allocated session.

5. The method of claim 4 wherein the first consumption rate is measured in frames per second.

6. The method of claim 1 wherein the currently allocated session is associated with the GUI that is part of a conferencing application.

7. The method of claim 1 wherein the computing system is a virtualized server computing system.

8. The method of claim 1 wherein the updates to the GUI comprise an update data frame created from the first frame buffer and the first state information associated with the currently allocated session.

9. A non-transitory computer-readable medium having contents that, when executed by one or more processors, enable a computing device to share a currently allocated session that is allocated to a first client device by performing a method comprising:

receiving, from a browser operating on a second client device, a hypertext transfer protocol (HTTP) request to remote a graphical user interface (GUI) of an application or a desktop running on a server to the second client device using HTTP requests and responses;
 determining connection characteristics for the second client device;
 determining whether to share the currently allocated session with the second client device based on the connection characteristics, the currently allocated session being used to remote the GUI of the application or the desktop running on the server to the first client device, wherein the second client device is distinct from the first client device, wherein the GUI is defined in a first frame buffer on the server and is associated with first state information;
 associating the second client device with the currently allocated session when a determination is made to share the currently allocated session;
 in response to the determination to share the currently allocated session, pausing all clients that share the currently allocated session and transmitting to said all clients a new key frame to align said all clients that share the currently allocated session, wherein transmitting the new key frame includes sending to the second client device over HTTP, the new key frame that contains an entire image of the first frame buffer on the server; and
 sending to the second client device over HTTP, a sequence of updates to the GUI of the application or the desktop running on the server contained in the first frame buffer and using the first state information associated with the currently allocated session.

10. The non-transitory computer-readable medium of claim 9, the method further comprising:

allocating a new session having a new session connection profile when a determination is made to not share the currently allocated session;
 associating the second client device with the new session when the determination is made to not share the currently allocated session; and
 sending image data to the second client device in accordance with a second frame buffer and second state information associated with the new session when the determination is made to not share the currently allocated session.

11. The non-transitory computer-readable medium of claim 10 wherein allocating the new session comprises:

splitting the currently allocated session into a first new session and a second new session;
 associating the first client device with the first session; and
 associating the second client device with the second session.

12. The non-transitory computer-readable medium of claim 9 wherein the determining whether to share the currently allocated session with the second client device based on the connection characteristics comprises:

determining a second consumption rate for the second client device; and
 determining whether the second consumption rate for the second client device is within a determined range of a first consumption rate associated with a session connection profile of a currently allocated session.

13. The non-transitory computer-readable medium of claim 9 wherein the computer-readable medium is a memory in the computing device.

14. The non-transitory computer-readable medium of claim 9 wherein the contents are instructions that when executed cause the computing device to perform the method.

15. A computing system for sharing a currently allocated session that is allocated to a first client device comprising:

a memory;
 a module stored on the memory that is configured, when executed, to:
  receive, from a browser operating on a second client device, a hypertext transfer protocol (HTTP) request to remote a graphical user interface (GUI) of an application or a desktop running on a server to the second client device using HTTP requests and responses;
  determine connection characteristics for the second client device;
  determine whether to share the currently allocated session with the second client device based on the connection characteristics, the currently allocated session being used to remote the GUI of the application or the desktop running on the server to the first client device, wherein the second client device is distinct from the first client device, wherein the GUI is defined in a first frame buffer on the server and is associated with first state information;
  associate the second client device with the currently allocated session when a determination is made to share the currently allocated session;
  in response to the determination to share the currently allocated session, pause all clients that share the currently allocated session and transmit to said all clients a new key frame to align said all clients that share the currently allocated session, wherein transmitting the new key frame includes sending to the second client device over HTTP, the new key frame that contains an entire image of the first frame buffer on the server; and
  send to the second client device over HTTP, a sequence of updates to the GUI of the application or the desktop running on the server contained in the first frame buffer and using the first state information associated with the currently allocated session.

16. The computing system of claim 15 wherein the module is further configured, when executed to:

allocate a new session having a new session connection profile when a determination is made to not share the currently allocated session;
 associate the second client device with the new session when the determination is made to not share the currently allocated session; and
 send image data to the second client device in accordance with a second frame buffer and second state information associated with the new session when the determination is made to not share the currently allocated session.

17. The computing system of claim 15 wherein the module includes software instructions for execution in the memory of the computing system.

18. The computing system of claim 15 wherein the computing system is a server computing device and the module is a shared remote session manager.

19. The computing system of claim 15 wherein the computing system further comprises:

a server computing device that includes the memory;

a client computing system that receives updated image blocks from the server computing device.

* * * * *